United States Patent
Kanemoto

(10) Patent No.: US 9,970,763 B2
(45) Date of Patent: May 15, 2018

(54) GYRO SENSOR, ELECTRONIC DEVICE, MOBILE APPARATUS, AND MANUFACTURING METHOD OF GYRO SENSOR

(71) Applicant: Seiko Epson Corporation, Tokyo (JP)

(72) Inventor: Kei Kanemoto, Suwa (JP)

(73) Assignee: Seiko Epson Corporation (JP)

( * ) Notice: Subject to any disclaimer, the term of this patent is extended or adjusted under 35 U.S.C. 154(b) by 139 days.

(21) Appl. No.: 15/016,454

(22) Filed: Feb. 5, 2016

(65) Prior Publication Data

US 2016/0258753 A1 Sep. 8, 2016

(30) Foreign Application Priority Data

Mar. 3, 2015 (JP) ................................ 2015-041554

(51) Int. Cl.
| | | |
|---|---|---|
| G01C 19/5726 | (2012.01) | |
| G01C 19/56 | (2012.01) | |
| G01C 25/00 | (2006.01) | |
| G01C 19/574 | (2012.01) | |

(52) U.S. Cl.
CPC ............ *G01C 19/56* (2013.01); *G01C 19/574* (2013.01); *G01C 19/5726* (2013.01); *G01C 25/005* (2013.01)

(58) Field of Classification Search
CPC .................. G01C 19/5726; G01G 19/5747
See application file for complete search history.

(56) References Cited

U.S. PATENT DOCUMENTS

| | | |
|---|---|---|
| 6,997,054 B2 | 2/2006 | Tsugai |
| 8,127,608 B2 | 3/2012 | Murashima |
| 2005/0274181 A1* | 12/2005 | Kutsuna ............ G01C 19/5726 |
| | | 73/504.12 |
| 2010/0127715 A1 | 5/2010 | Jeong et al. |
| 2014/0000365 A1* | 1/2014 | Aaltonen ........... G01C 19/5776 |
| | | 73/504.12 |

FOREIGN PATENT DOCUMENTS

| | | |
|---|---|---|
| JP | 2001-153659 A | 6/2001 |
| JP | 2003-270269 A | 9/2003 |
| JP | 2004-361388 A | 12/2004 |
| JP | 2007-327945 A | 12/2007 |
| JP | 2010-127763 A | 6/2010 |

* cited by examiner

*Primary Examiner* — John Chapman, Jr.
(74) *Attorney, Agent, or Firm* — Harness, Dickey & Pierce, P.L.C.

(57) ABSTRACT

A gyro sensor includes a substrate, an oscillation member, fixed driving electrodes and a movable driving electrode that oscillate the oscillation member, fixed detection electrodes and a movable detection electrode that detect a signal that varies in accordance with oscillation by Coriolis' force of the oscillation member, a bias voltage application unit that applies a bias voltage to the oscillation member, and a storage unit, and the bias voltage application unit sets a value of the bias voltage based on information stored in the storage unit.

8 Claims, 8 Drawing Sheets

GYRO SENSOR, ELECTRONIC DEVICE, MOBILE APPARATUS, AND MANUFACTURING METHOD OF GYRO SENSOR

BACKGROUND

1. Technical Field

The present invention relates to a gyro sensor, an electronic device, a mobile apparatus, and a manufacturing method of a gyro sensor.

2. Related Art

In recent years, angular velocity sensors (gyro sensors) that detect an angular velocity by using a silicon MEMS (Micro Electro Mechanical System) technology, for example, have been developed.

JP-A-2007-327945 discloses a gyro sensor having a sensitivity adjustment circuit that controls a variable gain to adjust sensitivity.

In the gyro sensor of JP-A-2007-327945, however, an increase in the gain of the sensitivity adjustment circuit for higher output sensitivity causes amplified noise. Thus, it is difficult for the gyro sensor of JP-A-2007-327945 to improve the S/N ratio.

SUMMARY

Some aspects of the invention provide a gyro sensor, an electronic device, a mobile apparatus, a manufacturing method of the gyro sensor, and the like in which sensitivity can be adjusted with a suppressed decrease in the S/N ratio.

The invention has been made to overcome at least a part of the problem described above and can be implemented as the following aspects or application examples.

Application Example 1

A gyro sensor according to the present application example includes: a substrate; an oscillation member; a fixed driving electrode that is fixed to the substrate and oscillates the oscillation member; a movable driving electrode that extends from the oscillation member and oscillates the oscillation member; a fixed detection electrode that is fixed to the substrate and detects a signal that varies according to oscillation of the oscillation member; a movable detection electrode that extends from the oscillation member and detects a signal that varies according to oscillation of the oscillation member; a bias voltage application unit that applies a bias voltage to the oscillation member; and a storage unit. The bias voltage application unit sets a value of the bias voltage based on information stored in the storage unit.

Application Example 2

A gyro sensor according to the present application example includes: a substrate; an oscillation member; a fixed driving electrode that is fixed to the substrate and oscillates the oscillation member; a movable driving electrode that is provided to the oscillation member and oscillates the oscillation member; a fixed detection electrode that is fixed to the substrate and detects a signal that varies according to oscillation of the oscillation member; a movable detection electrode that is provided to the oscillation member and detects a signal that varies according to oscillation of the oscillation member; a bias voltage application unit that applies a bias voltage to the movable detection electrode; and a storage unit. The bias voltage application unit sets a value of the bias voltage based on information stored in the storage unit.

Application Example 3

In the gyro sensors described above, the fixed detection electrode and the movable detection electrode may be provided to be opposed to each other.

According to these application examples, since changing the bias voltage allows for a change in the output sensitivity of the gyro sensor, the output sensitivity of the gyro sensor can be adjusted by overwriting the information stored in the storage unit. This realizes a gyro sensor whose sensitivity can be adjusted with a suppressed decrease in the S/N ratio.

Application Example 4

In the gyro sensor described above, the fixed detection electrode may be provided in areas on both sides of reciprocating ends of the movable detection electrode.

According to this application example, since the center of the reciprocation is less likely to move even when the bias voltage changes, an adverse effect on the characteristics due to a change in the bias voltage can be reduced.

Application Example 5

In the gyro sensor described above, the fixed detection electrode may be provided in an area on one side of reciprocating ends of the movable detection electrode.

According to this application example, when the bias voltage is increased, potential difference increases with decreasing distance so that the output sensitivity of the gyro sensor can be changed to a large degree even when a change in the bias voltage is small.

Application Example 6

In the gyro sensor described above, the information stored in the storage unit may be information that is set based on a signal from the fixed detection electrode.

According to this application example, the output sensitivity can be properly adjusted to a desired value.

Application Example 7

An electronic device according to this application example may be an electronic device including any one of the gyro sensors described above.

Application Example 8

A mobile apparatus according to this application example may be a mobile apparatus including any one of the gyro sensors described above.

According to these application examples, because of inclusion of the gyro sensor whose sensitivity can be adjusted with a suppressed decrease in the S/N ratio, an electronic device and a mobile apparatus with highly reliable operation can be realized.

Application Example 9

In a manufacturing method of a gyro sensor, according to this application example, the gyro sensor includes a substrate; an oscillation member; a fixed driving electrode that is fixed to the substrate and oscillates the oscillation member; a movable driving electrode that extends from the oscillation member and oscillates the oscillation member; a fixed detection electrode that is fixed to the substrate and detects a signal that varies according to oscillation of the oscillation member; a movable detection electrode that extends from the oscillation member and detects a signal that varies according to oscillation of the oscillation member; a bias voltage application unit that applies a bias voltage to the oscillation member; and a storage unit, and the bias voltage application unit sets a value of the bias voltage based on information stored in the storage unit. The manufacturing method includes measuring a signal from the fixed detection electrode; and, based on the signal, writing the information to the storage unit.

Application Example 10

In a manufacturing method of a gyro sensor, according to this application example, the gyro sensor includes a substrate; an oscillation member; a fixed driving electrode that is fixed to the substrate and oscillates the oscillation member; a movable driving electrode that is provided to the oscillation member and oscillates the oscillation member; a fixed detection electrode that is fixed to the substrate and detects a signal that varies according to oscillation of the oscillation member; a movable detection electrode that is provided to the oscillation member and detects a signal that varies according to oscillation of the oscillation member; a bias voltage application unit that applies a bias voltage to the movable detection electrode; and a storage unit, and the bias voltage application unit sets a value of the bias voltage based on information stored in the storage unit. The manufacturing method includes measuring a signal from the fixed detection electrode; and, based on the signal, writing the information to the storage unit.

According to these application examples described above, since changing the bias voltage enables the output sensitivity of the gyro sensor to be changed, the gyro sensor can be adjusted to a desired output sensitivity by writing information to the storage unit based on the signal from the fixed detection electrode. This realizes a manufacturing method of a gyro sensor that can manufacture a gyro sensor whose sensitivity can be adjusted with a suppressed decrease in the S/N ratio.

BRIEF DESCRIPTION OF THE DRAWINGS

The invention will be described with reference to the accompanying drawings, wherein like numbers reference like elements.

DESCRIPTION OF EXEMPLARY EMBODIMENTS

In the following, the preferable embodiments of the invention will be described in detail by using the drawings. The drawings used are provided for illustration only. Note that the embodiments described below are not intended to unreasonably limit the claimed invention. Further, not all of the components described below are necessary for the invention.

1. Gyro Sensor 1-1. Sensor Device

Figure 1:
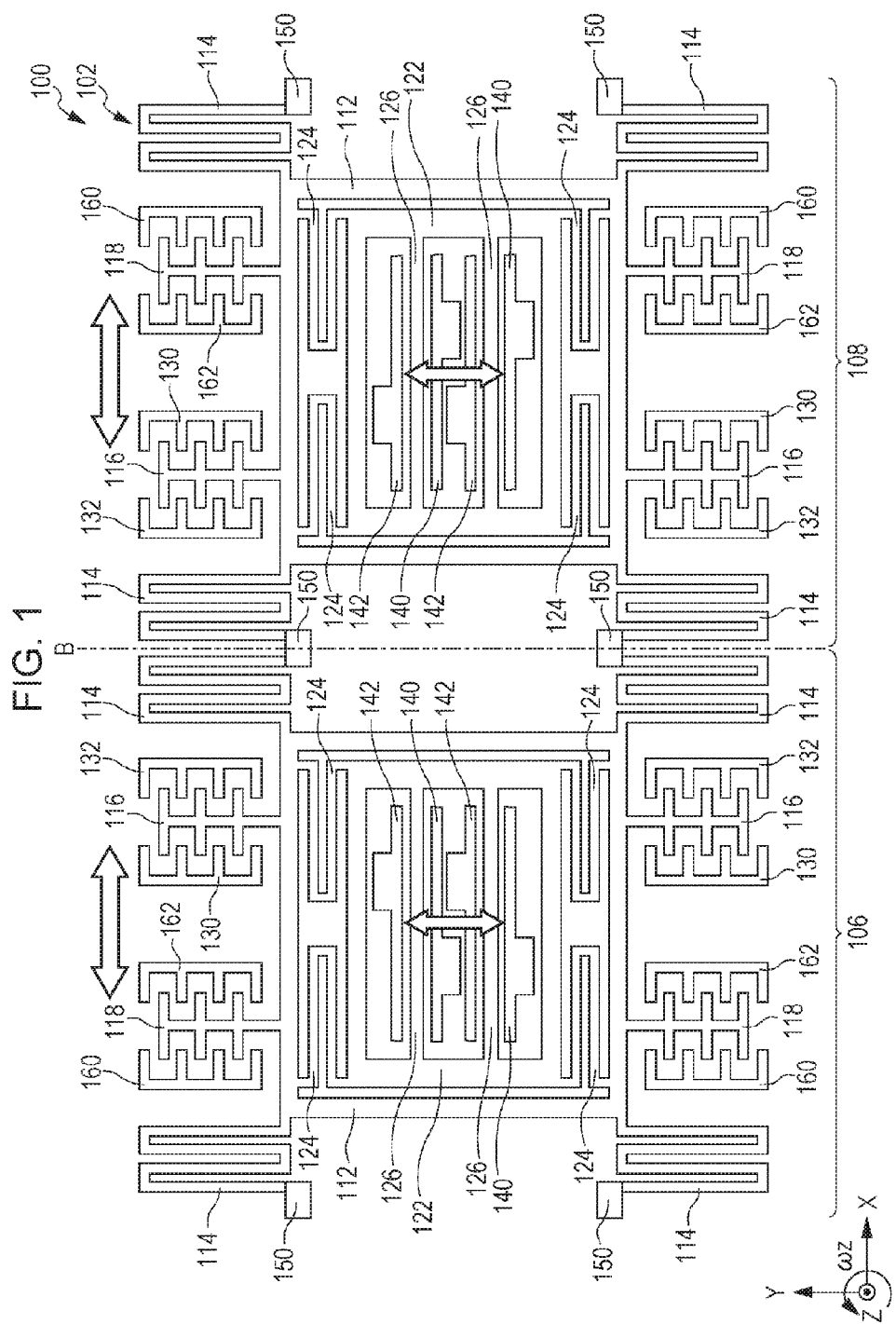
FIG. 1 is a plan view schematically illustrating a functional element included in a sensor device according to the present embodiment.
Figure 2:
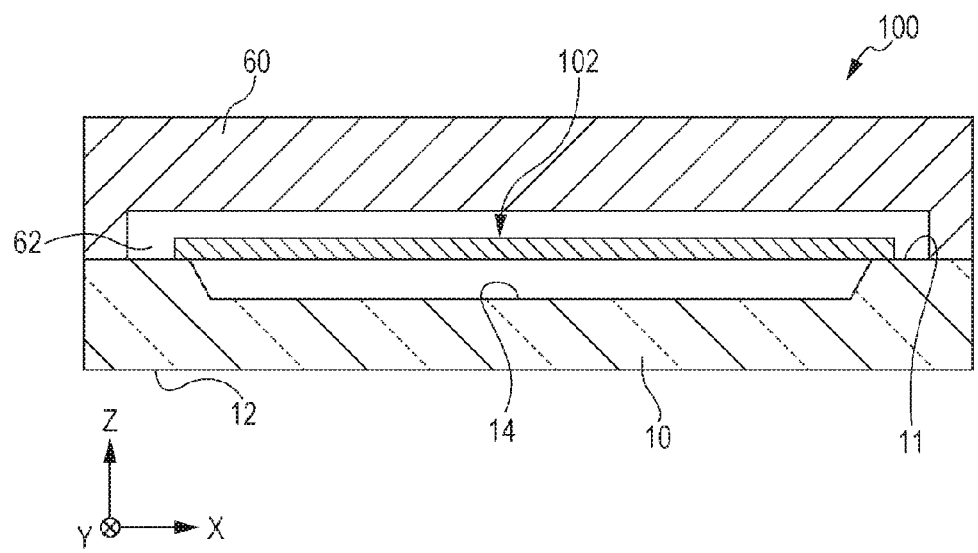
FIG. 2 is a sectional view schematically illustrating a functional element included in the sensor device according to the present embodiment.

First, a sensor device 100 included in a gyro sensor 1 according to the present embodiment will be described with reference to the drawings. FIG. 1 is a plan view schematically illustrating a functional element 102 included in the sensor device 100 according to the present embodiment. FIG. 2 is a sectional view schematically illustrating the functional element 102 included in the sensor device 100 according to the present embodiment. Note that, in FIG. 1, the X-axis, the Y-axis, and the Z-axis are presented as three axes orthogonal to each other.

As described in detail below, the sensor device 100 of the present embodiment may include a substrate 10, oscillation members 112, fixed driving electrodes 130 and fixed driving electrodes 132, movable driving electrodes 116, fixed monitor electrodes 160 and fixed monitor electrodes 162, movable monitor electrodes 118, fixed detection electrodes 140 and fixed detection electrodes 142, and movable detection electrodes 126.

The sensor device 100 may include the substrate 10, the functional element 102, and a cover member 60, as illustrated in FIG. 1 and FIG. 2. Note that, for simplified illustration, depiction of the substrate 10 and the cover member 60 is omitted in FIG. 1.

The material of the substrate 10 is glass or silicon, for example. As illustrated in FIG. 2, the substrate 10 has a first face 11 and a second face 12 that constitutes the other side of the first face 11. In the depicted example, the first face 11 and the second face 12 are planes parallel to the X-Y plane.

The functional element 102 is provided on the substrate 10 (on the first face 11 of the substrate 10). The following will describe an example in which the functional element 102 is a gyro sensor element (a capacitance-type MEMS gyro sensor element) that detects an angular velocity about the Z-axis.

As illustrated in FIG. 1, the functional element 102 has a first structure 106 and a second structure 108. The first structure 106 and the second structure 108 are coupled to each other in the X-axis direction. The first structure 106 is located on the −X direction side of the second structure 108. The structures 106 and 108 have symmetrical shapes with respect to a border line B thereof (a line in the Y-axis), for example, as illustrated in FIG. 1. Note that the functional element 102 may not have the second structure 108 and may consist of only the first structure 106 (not depicted).

As illustrated in FIG. 1, each of the structures 106 and 108 may have an oscillation member 112, first spring members 114, movable driving electrodes 116, a displacement member 122, second spring members 124, fixed driving electrodes 130 and 132, movable oscillation detection electrodes 118 and 126, fixed oscillation detection electrodes 140, 142, 160, and 162, and anchor members 150. The movable oscillation detection electrodes 118 and 126 are divided into movable monitor electrodes 118 and movable detection electrodes 126. The fixed oscillation detection electrodes 140, 142, 160, and 162 are divided into fixed detection electrodes 140 and 142 and fixed monitor electrodes 160 and 162.

The oscillation member 112, the spring members 114 and 124, the movable driving electrodes 116, the movable monitor electrodes 118, the displacement member 122, the movable detection electrodes 126, and the anchor members 150 are formed in an integrated manner by machining a silicon substrate (not depicted) joined to the substrate 10, for example. Thus, it is possible to apply a fine machining technology that is used in the manufacturing of silicon semiconductor devices and that allows for a reduced size of the functional element 102. The material of the functional element 102 is, for example, silicon provided with electro-conductivity by being doped with impurities such as phosphorus, boron, or the like. Note that the movable driving electrodes 116, the movable monitor electrodes 118, and the movable detection electrodes 126 may be provided on the surface of the oscillation member 112 or the like as separate members of the oscillation member 112.

The oscillation member 112 has a frame-like shape, for example. The displacement member 122, the movable detection electrodes 126, and the fixed detection electrodes 140 and 142 are provided inside the oscillation member 112.

In each of the first spring members 114, one end thereof is connected to the oscillation member 112 and the other end is connected to the anchor member 150. The anchor members 150 are fixed to the substrate 10 (on the first face 11 of the substrate 10). That is, there is no recess portion 14 provided under the anchor members 150. The oscillation member 112 is supported by the anchor members 150 via the first spring members 114. In the depicted example, the first structure 106 and the second structure 108 are each provided with four first spring members 114. Note that the anchor members 150 on the border line B between the first structure 106 and the second structure 108 may not be provided.

The first spring members 114 are formed to be able to displace the oscillation member 112 in the X-axis direction. More specifically, the first spring members 114 each have a shape extending in the X-axis direction (in the X-axis direction) and reciprocate in the Y-axis direction (in the Y-axis direction). Note that the number of the first spring members 114 is not limited as long as the oscillation member 112 can be oscillated in the X-axis direction.

The movable driving electrodes 116 are connected to the oscillation member 112. The movable driving electrodes 116 extend in the +Y direction and the −Y direction from the oscillation member 112. A plurality of movable driving electrodes 116 are provided, and the plurality of movable driving electrodes 116 may be aligned in the X-axis direction. The movable driving electrodes 116 can oscillate in the X-axis direction in response to oscillation of the oscillation member 112.

The fixed driving electrodes 130 and 132 are fixed to the substrate 10 (on the first face 11 of the substrate 10) and provided on the +Y direction side of the oscillation member 112 and on the −Y direction side of the oscillation member 112.

The fixed driving electrodes 130 and 132 face the movable driving electrode 116 and are provided interposing the movable driving electrode 116. More specifically, regarding the fixed driving electrodes 130 and 132 interposing the movable driving electrode 116, in the first structure 106, the fixed driving electrode 130 is provided on the −X direction side of the movable driving electrode 116, and the fixed driving electrode 132 is provided on the +X direction side of the movable driving electrode 116. In the second structure 108, the fixed driving electrode 130 is provided on the +X direction side of the movable driving electrode 116, and the fixed driving electrode 132 is provided on the −X direction side of the movable driving electrode 116.

In the example illustrated in FIG. 1, the fixed driving electrodes 130 and 132 each have a comb-teeth shape, and the movable driving electrode 116 has a shape such that it can be inserted between the comb-teeth of the fixed driving electrodes 130 and 132. A plurality of paired fixed driving electrodes 130 and 132 are provided depending on the number of the movable driving electrodes 116 and may be aligned in the X-axis direction. The fixed driving electrodes 130 and 132 and the movable driving electrode 116 are electrodes for oscillating the oscillation member 112.

The movable monitor electrodes 118 are connected to the oscillation member 112. The movable monitor electrodes 118 extend in the +Y direction and the −Y direction from the oscillation member 112. In the example illustrated in FIG. 1, one movable monitor electrode 118 each is provided on the +Y direction side of the oscillation member 112 of the first structure 106 and on the +Y direction side of the oscillation member 112 of the second structure 108, respectively, and a plurality of movable driving electrodes 116 are aligned between the movable monitor electrodes 118. Furthermore, one movable monitor electrode 118 each is provided on the −Y direction side of the oscillation member 112 of the first structure 106 and on the −Y direction side of the oscillation member 112 of the second structure 108, respectively, and a plurality of movable driving electrodes 116 are aligned between the movable monitor electrodes 118. The shape of the movable monitor electrode 118 in plan view is the same as the plan view of the movable driving electrode 116, for example. The movable monitor electrodes 118 can oscillate, that is, reciprocate in the X-axis direction in response to oscillation of the oscillation member 112.

The fixed monitor electrodes 160 and 162 are fixed to the substrate 10 (on the first face 11 of the substrate 10) and provided on the +Y direction side of the oscillation member 112 and the −Y direction side of the oscillation member 112.

The fixed monitor electrodes 160 and 162 face the movable monitor electrode 118 and are provided interposing the movable monitor electrode 118. More specifically, regarding the fixed monitor electrodes 160 and 162 interposing the movable monitor electrode 118, in the first structure 106, the fixed monitor electrode 160 is provided on the −X direction side of the movable monitor electrode 118, and the fixed monitor electrode 162 is provided on the +X direction side of the movable monitor electrode 118. In the second structure 108, the fixed monitor electrode 160 is provided on the +X direction side of the movable monitor electrode 118, and the fixed monitor electrode 162 is provided on the −X direction side of the movable monitor electrode 118.

The fixed monitor electrodes 160 and 162 each have a comb-teeth shape, and the movable monitor electrode 118 has a shape such that it can be inserted between the comb-teeth of the fixed monitor electrodes 160 and 162.

The fixed monitor electrodes 160 and 162 and the movable monitor electrode 118 are electrodes for detecting a signal that varies according to oscillation of the oscillation member 112 and thus are electrodes for detecting an oscillation state of the oscillation member 112. More specifically, a displacement in the X-axis direction of the movable monitor electrode 118 causes a change in the static capacitance between the movable monitor electrode 118 and the fixed monitor electrode 160 and a change in the static capacitance between the movable monitor electrode 118 and the fixed monitor electrode 162. This in turn causes a change in the current in the fixed monitor electrodes 160 and 162. By detecting the change in the current, the oscillation state of the oscillation member 112 can be detected.

The displacement member 122 is connected to the oscillation member 112 via the second spring members 124. In the depicted example, the shape in the plan view of the displacement member 122 is a rectangle having the long sides extending in the Y-axis direction. Note that the displacement member 122 may be provided outside the oscillation member 112 (not depicted).

The second spring member 124 is configured to be able to displace the displacement member 122 in the Y-axis direction. More specifically, the second spring members 124 each have a shape extending in the X-axis direction and reciprocate in the Y-axis direction. Note that the number of the second spring members 124 is not limited as long as the displacement member 122 can be displaced in the Y-axis direction.

The movable detection electrodes 126 are connected to the displacement member 122. A plurality of movable detection electrodes 126 are provided, for example. The movable detection electrodes 126 extend in the +X direction and the −X direction from the displacement member 122.

The fixed detection electrodes 140 and 142 are fixed to the substrate 10 (on the first face 11 of the substrate 10). More specifically, in the fixed detection electrodes 140 and 142, one end thereof is fixed to the substrate 10 and the other end extends on the displacement member 122 side as a free end.

The fixed detection electrodes 140 and 142 face the movable detection electrode 126 and are provided interposing the movable detection electrode 126. More specifically, regarding the fixed detection electrodes 140 and 142 interposing the movable detection electrode 126, in the first structure 106, the fixed detection electrode 140 is provided on the −Y direction side of the movable detection electrode 126, and the fixed detection electrode 142 is provided on the +Y direction side of the movable detection electrode 126. In the second structure 108, the fixed detection electrode 140 is provided on the +Y direction side of the movable detection electrode 126, and the fixed detection electrode 142 is provided on the −Y direction side of the movable detection electrode 126.

In the example illustrated in FIG. 1, a plurality of fixed detection electrodes 140 and 142 are provided and aligned in an alternating manner in the Y-axis direction. The fixed detection electrodes 140 and 142 and the movable detection electrode 126 are electrodes for detecting a signal (a static capacitance) that varies according to oscillation of the oscillation member 112.

As illustrated in FIG. 2, the cover member 60 is provided on the substrate 10. The substrate 10 and the cover member 60 can make up a package. The substrate 10 and the cover member 60 can form a cavity 62, and the functional element 102 can be accommodated in the cavity 62. The cavity 62 is vacuum-sealed, for example. The material of the cover member 60 is, for example, silicon or glass.

Next, operation of the sensor device 100 will be described. FIG. 3 to FIG. 6 are drawings for illustrating the operation of the sensor device 100. Note that, in FIG. 3 to FIG. 6, the X-axis, the Y-axis, and the Z-axis are presented as three axes orthogonal to each other. Further, for simplified illustration, in FIG. 3 to FIG. 6, depiction of other members than the functional element 102 is omitted, and depiction of the movable driving electrodes 116, the movable monitor electrodes 118, the movable detection electrodes 126, the fixed driving electrodes 130 and 132, the fixed detection electrodes 140 and 142, and the fixed monitor electrodes 160 and 162 is omitted to depict the functional element 102 in a simplified manner.

Figure 3:
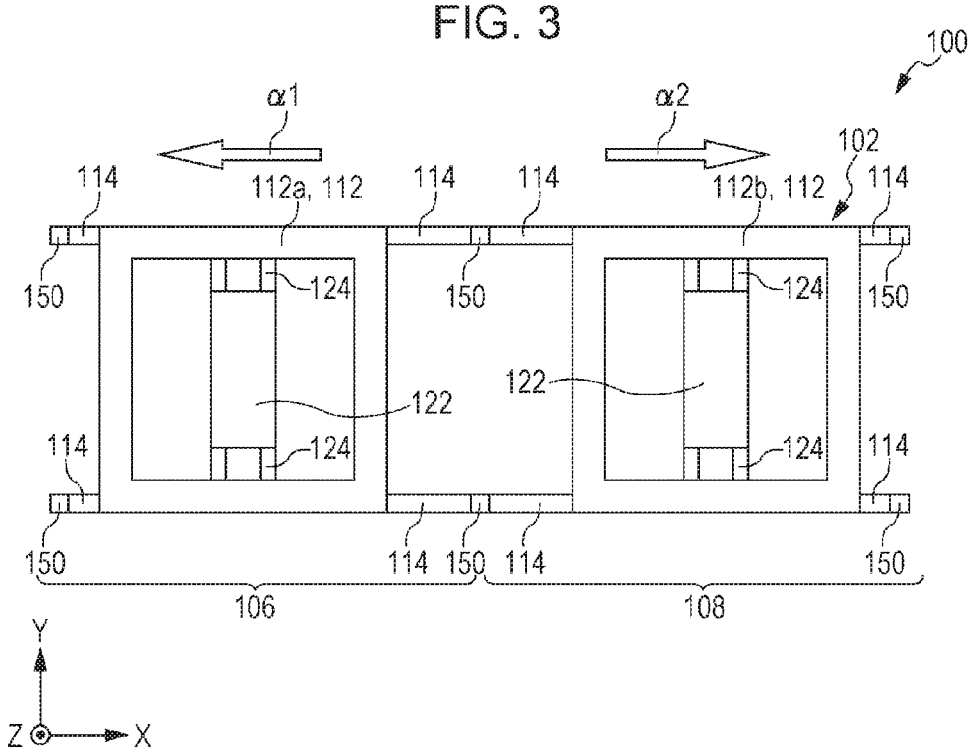
FIG. 3 is a view for illustrating operation of the sensor device according to the present embodiment.
Figure 4:
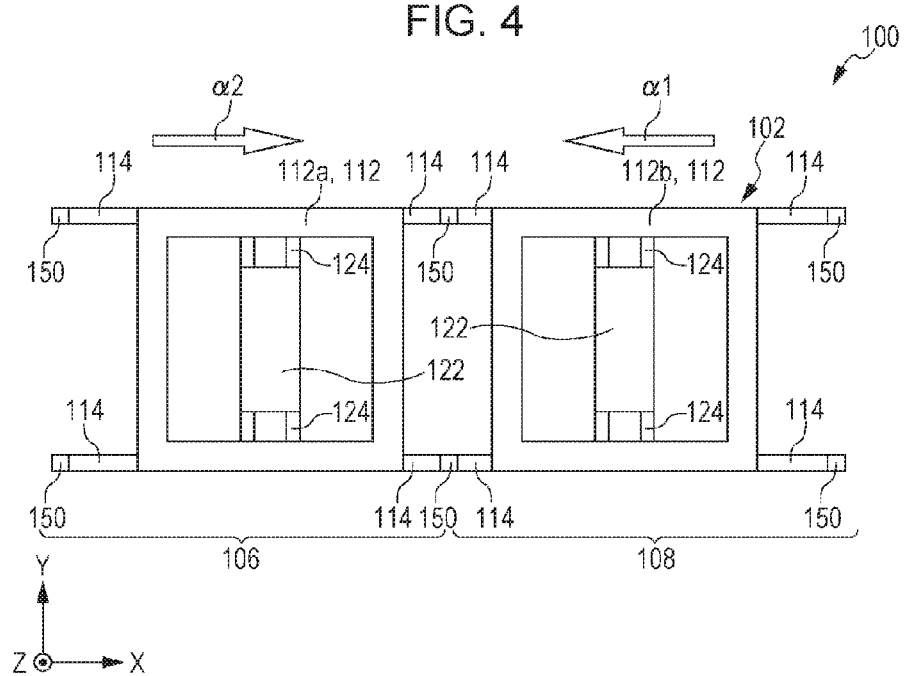
FIG. 4 is a view for illustrating operation of the sensor device according to the present embodiment.

Application of a voltage between the movable driving electrode 116 and the fixed driving electrodes 130 and 132 by using a not-illustrated power source can generate an electrostatic force between the movable driving electrode 116 and the fixed driving electrodes 130 and 132 (see FIG. 1). This can cause the first spring members 114 to expand and contract in the X-axis direction and oscillate the oscillation members 112 in X-axis, as illustrated in FIG. 3 and FIG. 4.

More specifically, a constant bias voltage Vr is applied to the movable driving electrodes 116. Further, a first AC voltage is applied to the fixed driving electrodes 130 based on a predetermined reference voltage via not-illustrated driving wirings. Further, a second AC voltage whose phase is shifted by 180 degrees from the first AC voltage is applied to the fixed driving electrodes 132 based on the predetermined reference voltage via not-illustrated driving wirings.

Regarding the fixed driving electrodes 130 and 132 interposing the movable driving electrode 116, in the first structure 106, the fixed driving electrode 130 is provided on the −X direction side of the movable driving electrode 116, and the fixed driving electrode 132 is provided on the +X direction side of the movable driving electrode 116 (see FIG. 1). In the second structure 108, the fixed driving electrode 130 is provided on the +X direction side of the movable driving electrode 116, and the fixed driving electrode 132 is provided on the −X direction side of the movable driving electrode 116 (see FIG. 1). Therefore, the first AC voltage and the second AC voltage allow an oscillation member 112a of the first structure 106 and an oscillation member 112b of the second structure 108 to oscillate in the X-axis direction at a predetermined frequency in inversed phases. In the example illustrated in FIG. 3, the oscillation member 112a is displaced in α1 direction, while the oscillation member 112b is displaced in α2 direction, which is opposite to α1 direction. In the example illustrated in FIG. 4, the oscillation member 112a is displaced in α2 direction, while the oscillation member 112b is displaced in α1 direction.

Note that the displacement members 122 are displaced in the X-axis direction in response to oscillation of the oscillation members 112. In a similar manner, the movable detection electrodes 126 (see FIG. 1) are displaced in the X-axis direction in response to oscillation of the oscillation members 112.

Figure 5:
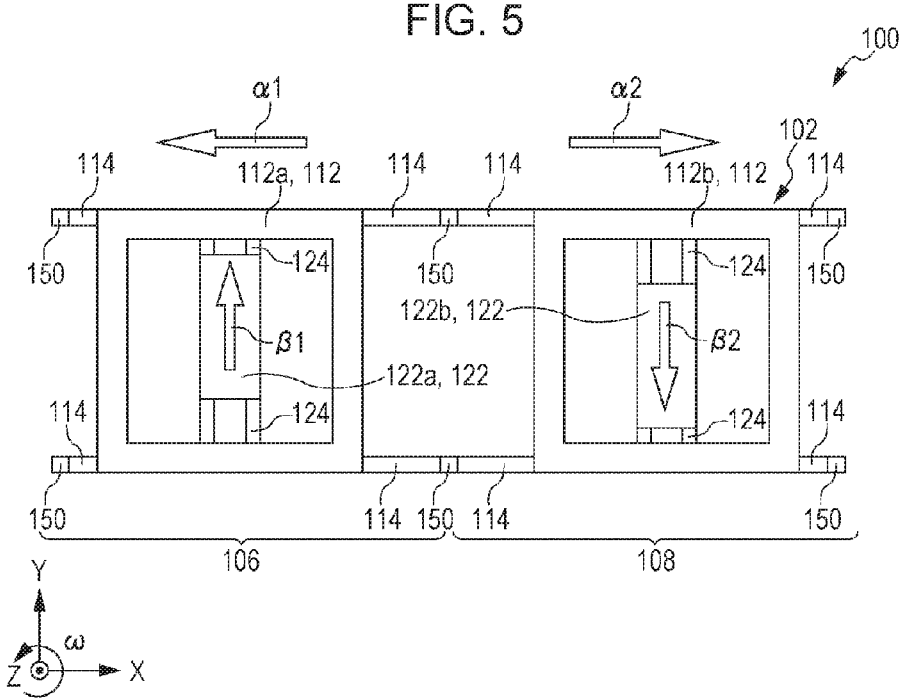
FIG. 5 is a view for illustrating operation of the sensor device according to the present embodiment.
Figure 6:
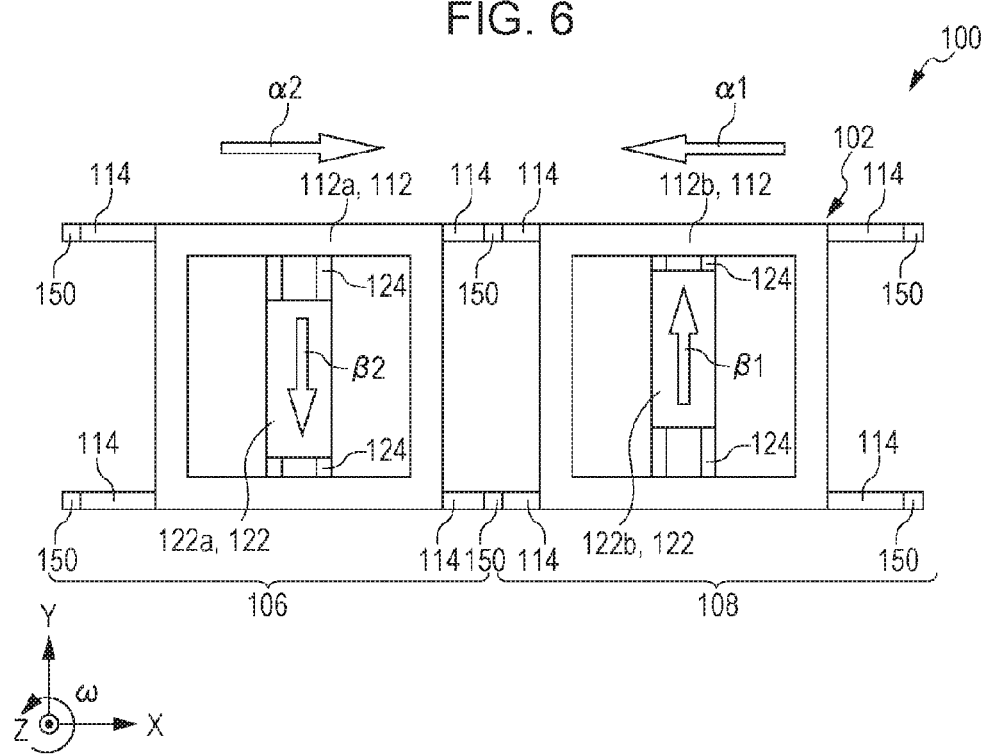
FIG. 6 is a view for illustrating operation of the sensor device according to the present embodiment.

As illustrated in FIG. 5 and FIG. 6, in a state where the oscillation members 112a and 112b oscillate in the X-axis direction, when an angular velocity ω about Z-axis is applied to the functional element 102, Coriolis' force is generated to cause the displacement members 122 to be displaced in the Y-axis direction. That is, the displacement member 122a connected to the oscillation member 112a and the displacement member 122b connected to the oscillation member 112b are displaced in the opposite directions to each other in the Y-axis direction. In the example illustrated in FIG. 5, the displacement member 122a is displaced in β1 direction, while the displacement member 122b is displaced in β2 direction, which is opposite to β1 direction. In the example illustrated in FIG. 6, the second displacement member 122a is displaced in β2 direction, while the displacement member 122b is displaced in β1 direction.

As the displacement members 122a and 122b are displaced in Y-axis, the distance between the movable detection electrodes 126 and the fixed detection electrodes 140 changes (see FIG. 1). In a similar manner, the distance between the movable detection electrodes 126 and the fixed detection electrodes 142 changes (see FIG. 1). Therefore, the static capacitance between the movable detection electrodes 126 and the fixed detection electrodes 140 changes. In a similar manner, the static capacitance between the movable detection electrodes 126 and the fixed detection electrodes 142 changes.

In the sensor device 100, a change in the static capacitance between the movable detection electrodes 126 and the fixed detection electrodes 140 can be detected (see FIG. 1) by applying a voltage between the movable detection electrodes 126 and the fixed detection electrodes 140. Furthermore, a change in the static capacitance between the movable detection electrodes 126 and the fixed detection electrodes 142 can be detected (see FIG. 1) by applying a voltage between the movable detection electrodes 126 and the fixed detection electrodes 142. In such a way, the sensor device 100 can derive an angular velocity ω about Z-axis based on a change in the static capacitance between the movable detection electrodes 126 and the fixed detection electrodes 140 and 142.

Furthermore, in the sensor device 100, as the oscillation members 112a and 112b oscillate in X direction, the distance between the movable monitor electrodes 118 and the fixed monitor electrodes 160 changes (see FIG. 1). In a similar manner, the distance between the movable monitor electrodes 118 and the fixed monitor electrodes 162 changes (see FIG. 1). Therefore, the static capacitance between the movable monitor electrodes 118 and the fixed monitor electrodes 160 changes. In a similar manner, the movable monitor electrodes 118 and the fixed monitor electrodes 162 changes. In response, the current flowing in the fixed monitor electrodes 160 and 162 changes. The oscillation state of the oscillation members 112a and 112b can be detected (monitored) based on the change in the current.

In the gyro sensor 1 of the present embodiment, as seen in the example illustrated in FIG. 1, the fixed detection electrodes 140 and 142 are provided in areas on both sides of reciprocating ends of the movable detection electrodes 126.

According to this embodiment, since the center of the reciprocation is less likely to change even when the bias voltage Vr is changed by a bias voltage application unit 610 described later, an adverse effect to the characteristics due to a change in the bias voltage Vr can be reduced.

In the gyro sensor 1 of the present embodiment, the fixed detection electrode (the fixed detection electrode 140 or the fixed detection electrode 142) may be provided in an area on one side only of the reciprocating ends of the movable detection electrodes 126.

According to this embodiment, when the bias voltage Vr is increased by the bias voltage application unit 610 described later, potential difference increases with decreasing distance so that the output sensitivity of the gyro sensor 1 can be changed to a large degree even when a change in the bias voltage Vr is small.

1-2. Driving Circuit and Detection Circuit

Figure 7:
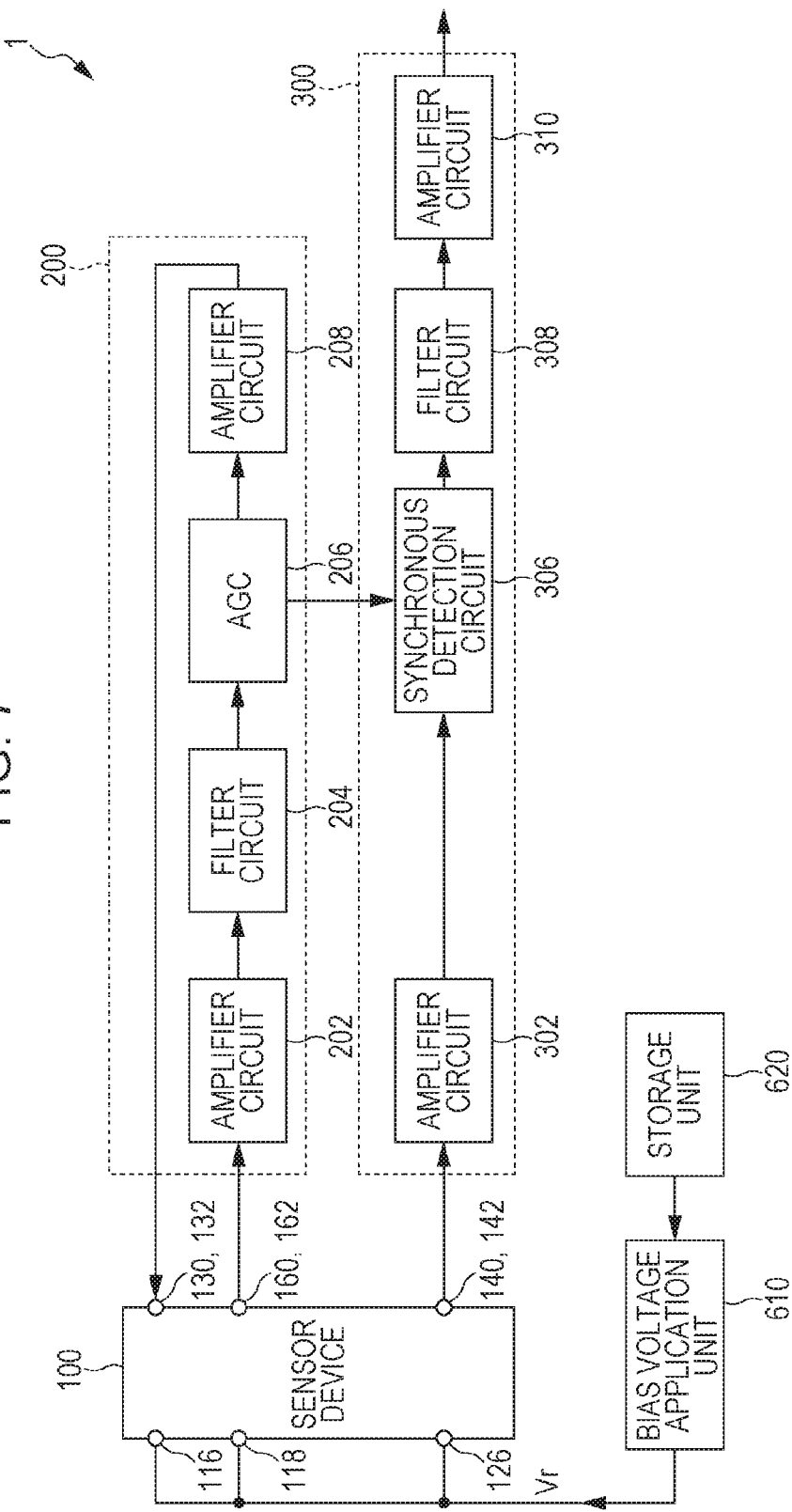
FIG. 7 is a circuit diagram of the gyro sensor according to the present embodiment.

FIG. 7 is a circuit diagram of the gyro sensor 1 according to the present embodiment. The gyro sensor 1 includes the sensor device 100 described above, a driving circuit 200, a detection circuit 300, the bias voltage application unit 610, and a storage unit 620.

The driving circuit 200 generates a driving signal based on a signal from at least one of the fixed monitor electrodes 160 and 162 and the movable monitor electrode 118 and outputs the driving signal to at least one of the fixed driving electrodes 130 and 132 and the movable driving electrode 116. In the present embodiment, the driving circuit 200 generates a driving signal based on a signal from the fixed monitor electrodes 160 and 162 and outputs the driving signal to the fixed driving electrodes 130 and 132.

The driving circuit 200 outputs the driving signal to drive the sensor device 100 and receives a feedback signal from the sensor device 100. Thereby, the driving circuit 200 excites the sensor device 100. The detection circuit 300 receives a detection signal from the sensor device 100 driven by the driving signal and extracts from the detection signal an angular velocity component that is based on Coriolis' force.

The driving circuit 200 in the present embodiment includes an amplifier circuit 202, a filter circuit 204, an AGC (Automatic Gain Control circuit) 206, and an amplifier circuit 208.

Upon oscillation of the oscillation members 112 of the sensor device 100, a current based on a change in the capacitance is outputted from the fixed monitor electrodes 160 and 162 as a feedback signal and inputted to the amplifier circuit 202. The amplifier circuit 202 outputs an AC voltage signal having the same frequency as the oscillation frequency of the oscillation members 112.

The AC voltage signal outputted from the amplifier circuit 202 is inputted to the filter circuit 204. The filter circuit 204 filters out unnecessary frequency components of the inputted AC voltage signal. As the filter circuit 204, a band-pass filter may be employed, for example.

The AC voltage signal outputted from the filter circuit 204 is inputted to the AGC 206. The AGC 206 controls a gain so as to maintain an amplitude of the inputted AC voltage signal at a constant value and outputs the AC voltage signal having the controlled gain to the amplifier circuit 208 and a synchronous detection circuit 306 (described later) of the detection circuit 300.

The amplifier circuit 208 amplifies the inputted AC voltage signal to generate a driving signal and outputs it to the fixed driving electrodes 130 and 132. The sensor device 100 is driven by this driving signal (AC voltage signal) inputted to the fixed driving electrodes 130 and 132.

The detection circuit 300 in the present embodiment includes an amplifier circuit 302, the synchronous detection circuit 306, a filter circuit 308, and an amplifier circuit 310.

Signals outputted from the fixed detection electrodes 140 and 142 contain an angular velocity component, which is based on Coriolis' force working on the sensor device 100, and a self-oscillation component (a leakage signal component), which is based on an excitation oscillation of the sensor device 100. The detection circuit 300 extracts the angular velocity component from the signal outputted from the fixed detection electrodes 140 and 142.

Upon oscillation of the oscillation members 112 of the sensor device 100, a current based on a change in the capacitance is outputted from the fixed detection electrodes 140 and 142 and inputted to the amplifier circuit 302. The amplifier circuit 302 outputs the AC voltage signal to the synchronous detection circuit 306.

The synchronous detection circuit 306 synchronously detects a signal from at least one of the fixed detection electrodes 140 and 142 and the movable detection electrode 126 based on a signal from at least one of the fixed monitor electrodes 160 and 162 and the movable monitor electrode 118. In the present embodiment, the synchronous detection circuit 306 synchronously detects a signal from the fixed detection electrodes 140 and 142 based on a signal from the fixed monitor electrodes 160 and 162. In the example illustrated in FIG. 7, the synchronous detection circuit 306 synchronously detects an output signal of the amplifier circuit 302 based on an output signal of the AGC 206. The angular velocity component signal extracted by the synchronous detection circuit 306 is inputted to the filter circuit 308.

The filter circuit 308 is formed of a low-pass filter that filters out high frequency components of the angular velocity component signal to convert it to a DC voltage signal. The filter circuit 308 outputs an output signal to the amplifier circuit 310.

The amplifier circuit 310 amplifies the inputted signal to output a voltage signal that is based on the angular velocity.

The bias voltage application unit 610 applies a bias voltage Vr to the oscillation members 112 of the sensor device 100. In the present embodiment, while the bias voltage Vr is applied to the oscillation members 112 via the anchor member 150 of FIG. 1, the bias voltage Vr is also applied to the movable driving electrodes 116, the movable monitor electrodes 118, and the movable detection electrodes 126, because the oscillation members 112 are integrated with the movable driving electrodes 116, the movable monitor electrodes 118, and the movable detection electrodes 126. Note that the oscillation members 112 may be at least electrically integrated with the movable driving electrodes 116, the movable monitor electrodes 118, and the movable detection electrodes 126. The bias voltage application unit 610 sets a value of the bias voltage Vr based on information stored in the storage unit 620.

The storage unit 620 stores therein information on a value of the bias voltage Vr set by the bias voltage application unit 610. The storage unit 620 is preferably formed of a non-volatile memory.

According to the present embodiment, since changing the bias voltage Vr allows for a change in the output sensitivity of the gyro sensor 1, the output sensitivity of the gyro sensor 1 can be adjusted by overwriting the information stored in the storage unit 620. Therefore, the present embodiment can realize the gyro sensor 1 whose sensitivity can be adjusted with a suppressed decrease in the S/N ratio, compared to the case where the output sensitivity of the gyro sensor 1 were adjusted by changing an amplification factor of the amplifier circuit 310, for example.

In the present embodiment, the information stored in the storage unit 620 may be information which is set based on a signal from the fixed detection electrodes 140 and 142. The information stored in the storage unit 620 may be set such that the output signal of the amplifier circuit 302 arranged on the signal path from the fixed detection electrodes 140 and 142 has a desired amplitude, or may be set such that the output signal of the amplifier circuit 310 becomes a desired value.

According to the present embodiment, the output sensitivity of the gyro sensor 1 can be properly adjusted to a desired output sensitivity.

2. Manufacturing Method of Gyro Sensor

Figure 8:
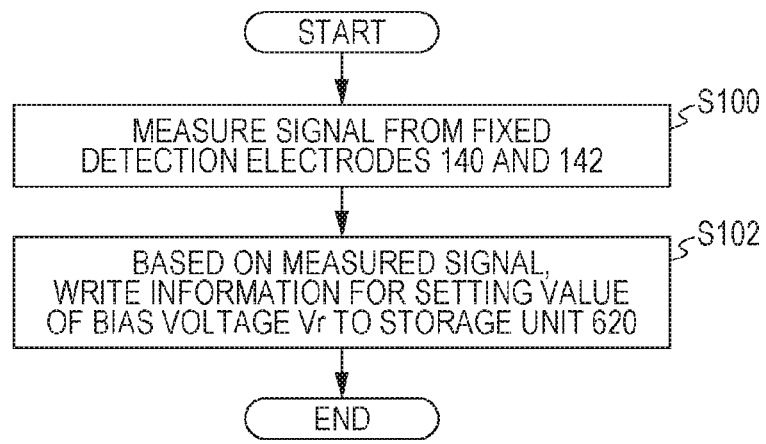
FIG. 8 is a flowchart illustrating a manufacturing method of the gyro sensor according to the present embodiment.

FIG. 8 is a flowchart illustrating a manufacturing method of the gyro sensor 1 according to the present embodiment. Note that, as described above, the movable driving electrodes 116, the movable monitor electrodes 118, and the movable detection electrodes 126 may be integrated with the oscillation members 112, or may be provided on the surface or the like of the oscillation members 112 as a separate member of the oscillation members 112.

The manufacturing method of the gyro sensor 1 according to the present embodiment includes a process of measuring a signal from the fixed detection electrodes 140 and 142, and a process of, based on the measured signal, writing to the storage unit 620 information for setting a value of the bias voltage Vr.

First, a signal from the fixed detection electrodes 140 and 142 is measured (step S100). At step S100, for example, an amplitude of an output signal of the amplifier circuit 302 arranged on a signal path from the fixed detection electrodes 140 and 142 may be detected, or a value of an output signal of the amplifier circuit 310 may be detected.

After step S100, based on the signal measured at step S100, information for setting a value of the bias voltage Vr is written to the storage unit 620 (step S102). At step S102, for example, the bias voltage Vr may be set such that an output signal of the amplifier circuit 302 arranged on the signal path from the fixed detection electrodes 140 and 142 has a desired amplitude, or the bias voltage Vr may be set such that an output signal of the amplifier circuit 310 becomes a desired value.

According to the present embodiment, since changing the bias voltage Vr allows for a change in the output sensitivity of the gyro sensor 1, the gyro sensor 1 can be adjusted to have a desired output sensitivity by writing information to the storage unit 620 based on the signal from the fixed detection electrodes 140 and 142. Therefore, the present embodiment can realize the manufacturing method of the gyro sensor 1 that can manufacture the gyro sensor 1 whose sensitivity can be adjusted with a suppressed decrease in the S/N ratio.

3. Electronic Device

Figure 9:
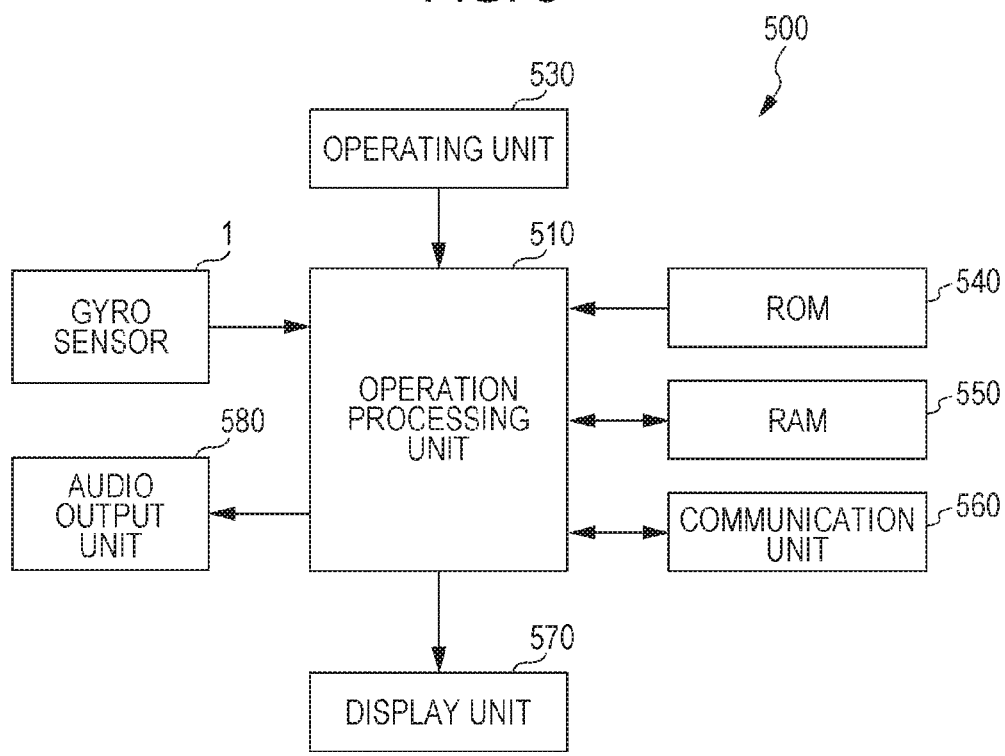
FIG. 9 is a block diagram of an electronic device according to the present embodiment.

FIG. 9 is a functional block diagram of an electronic device 500 according to the present embodiment. Note that components similar to those described in each embodiment described above are provided with the same reference numerals, and detailed description thereof will be omitted.

The electronic device 500 according to the present embodiment is the electronic device 500 including the gyro sensor 1. In an example illustrated in FIG. 9, the electronic device 500 includes the gyro sensor 1, an operation processing unit 510, an operating unit 530, a ROM (Read Only Memory) 540, a RAM (Random Access Memory) 550, a communication unit 560, a display unit 570, and an audio output unit 580. Note that, in the electronic device 500 of the present embodiment, a part of the components (units) illustrated in FIG. 9 may be omitted or changed, or other components may be added.

The operation processing unit 510 performs various calculation processes and/or control processes according to programs stored in the ROM 540 or the like. Specifically, the operation processing unit 510 performs various processes based on output signals of the gyro sensor 1 and/or operation signals from the operating unit 530, a process of controlling the communication unit 560 for communicating data with some external unit, a process of transmitting display signals for displaying various information to the display unit 570, a process of causing the audio output unit 580 to output various sounds, and the like.

The operating unit 530 is an input device formed of operating keys, button switches, or the like, and outputs to the operation processing unit 510 an operating signal according to the user operation.

The ROM 540 stores programs, data, and the like for executing various calculation processes and/or control processes by the operation processing unit 510.

The RAM 550 is used as a working field of the operation processing unit 510, and temporarily stores programs and data read from the ROM 540, data inputted from the operating unit 530, operation results executed by the operation processing unit 510 according to various programs, and the like.

The communication unit 560 performs various controls for establishing a data communication between the operation processing unit 510 and the external unit.

The display unit 570 is a display device formed of an LCD (Liquid Crystal Display), an electrophoresis display, or the like, and displays various information based on a display signal inputted from the operation processing unit 510.

Finally, the audio output unit 580 is a device such as a speaker that outputs sounds.

The electronic device 500 of the present embodiment includes the gyro sensor 1 that enables sensitivity adjustment with a suppressed decrease in the S/N ratio, so that the electronic device 500 with highly reliable operation can be realized.

The electronic device 500 may be various electronic devices. The electronic device 500 may include, for example, a personal computer (for example, a mobile personal computer, a laptop personal computer, a tablet personal computer), a mobile unit terminal such as a mobile phone, a digital camera, an ink jet ejecting apparatus (for example, an ink jet printer), a storage area network device such as a router, a switch, or the like, a local area network device, an apparatus for a base station for mobile unit terminals, a television, a video camera, a video recorder, a car navigation device, a pager, an electronic organizer (including those with a communication function), an electronic dictionary, a calculator, an electronic game device, a game controller, a word processor, a workstation, a video-phone, a security video monitor, an electronic binocular telescope, a POS (point of sale) terminal, a medical device (for example, an electronic clinical thermometer, a sphygmomanometer, a blood glucose meter, an electrocardiogram measurement apparatus, an ultrasonography apparatus, an electronic endoscope), a fish finder, various measurement instruments, meters (for example, meters for a vehicle, an airplane, a ship), a flight simulator, a head mounted display, a motion trace, a motion tracking, a motion controller, a PDR (Pedestrian Dead Reckoning), and so on.

Figure 10A:
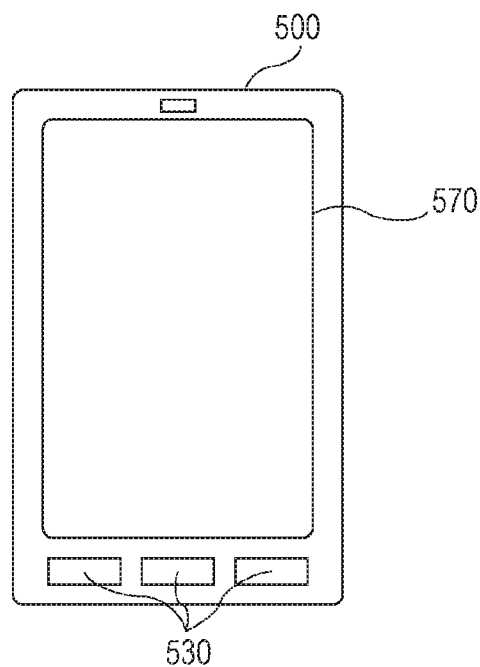
FIG. 10A is a view of an example external appearance of a smartphone as one example of the electronic device.
Figure 10B:
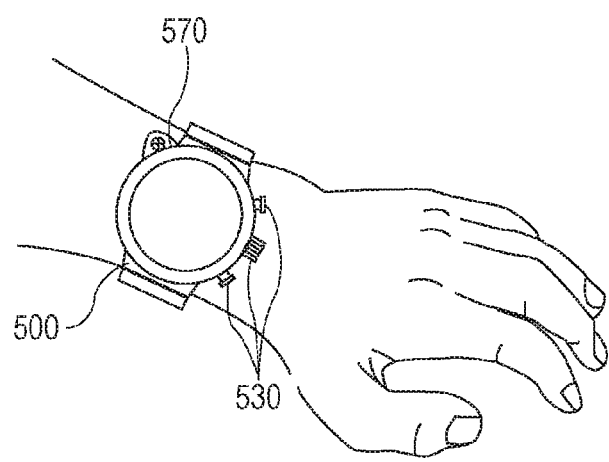
FIG. 10B is a view of an example external appearance of a wrist-wearable mobile device as another example of the electronic device.

FIG. 10A is a view of an example external appearance of a smartphone as one example of the electronic device 500, and FIG. 10B is a view of an example external appearance of a wrist-wearable mobile device as another example of the electronic device 500. The smartphone that is the electronic device 500 illustrated in FIG. 10A includes buttons as the operating unit 530 and an LCD as the display unit 570. The wrist-wearable mobile device that is the electronic device 500 illustrated in FIG. 10B includes buttons and a carabineer as the operating unit 530 and an LCD as the display unit 570. Since these electronic devices 500 include the gyro sensor 1 that enables sensitivity adjustment with a suppressed decrease in the S/N ratio, the electronic device 500 with highly reliable operation can be realized.

4. Mobile Apparatus

Figure 11:
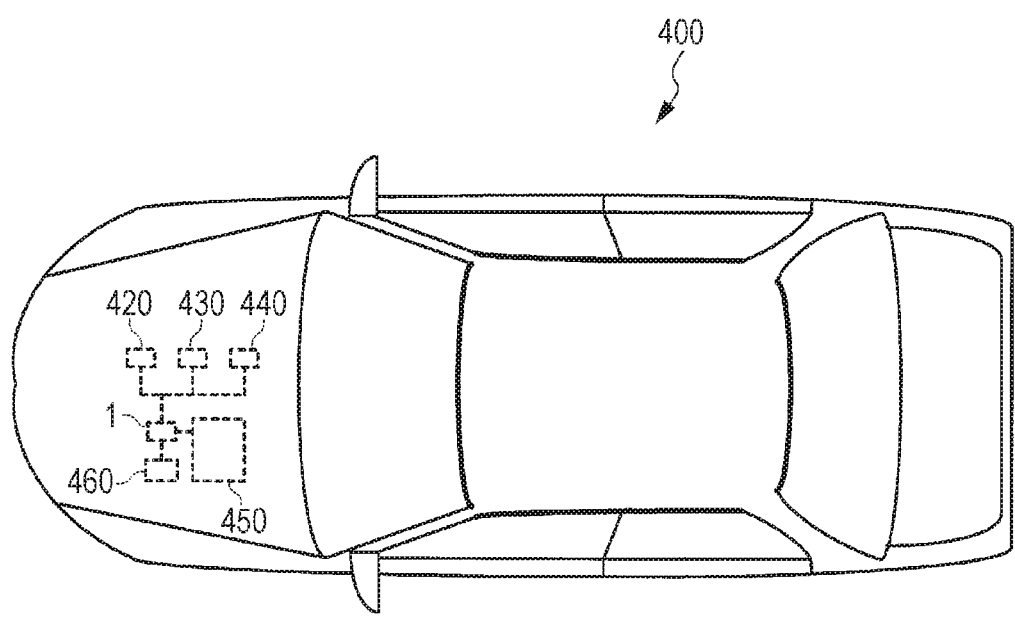
FIG. 11 is a view (a top view) of an example of a mobile apparatus according to the present embodiment.

FIG. 11 is a view (a top view) of an example of a mobile apparatus 400 according to the present embodiment. Note that components similar to those described in each embodiment described above are provided with the same reference numerals, and detailed description thereof will be omitted.

The mobile apparatus 400 of the present embodiment is the mobile apparatus 400 including the gyro sensor 1. In the example illustrated in FIG. 11, the mobile apparatus 400 includes controllers 420, 430, and 440 that perform various controls of an engine system, a break system, a keyless entry system, and so on, a battery 450, and a backup battery 460. Note that, in the mobile apparatus 400 of the present embodiment, a part of the components (units) illustrated in FIG. 11 may be omitted or changed, or other components may be added.

The mobile apparatus 400 according to the present embodiment includes the gyro sensor 1 that enables sensitivity adjustment with a suppressed decrease in the S/N ratio, so that the mobile apparatus 400 with highly reliable operation can be realized.

The mobile apparatus 400 may be various mobile apparatuses including, for example, an automobile (including an electric automobile), an airplane such as a jet aircraft, a helicopter, and the like, a ship, a rocket, a satellite, and the like.

While the present embodiment and the modifications thereof have been described above, the invention is not limited to the present embodiment or the modifications, but can be implemented in various forms without departing from its essence.

The invention includes configurations that are substantially the same as those described in the embodiment (for example, configurations having the same function, method, and result, or configurations having the same purpose and advantage). Further, the invention includes configurations in which replacement is applied to an unessential part of the configuration described in the embodiment. Further, the invention includes configurations that can provide the same effect and advantage or achieve the same purpose as the configuration described in the embodiment. Further, the invention includes configurations in which a known art is added to the configuration described in the embodiment.

The entire disclosure of Japanese Patent Application No: 2015-041554, filed Mar. 3, 2015 is expressly incorporated by reference herein.

What is claimed is:

1. A gyro sensor comprising:
   a substrate;
   an oscillation member that is connected to the substrate via a spring;
   a fixed driving electrode that is fixed to the substrate, the fixed driving electrode being configured to oscillate the oscillation member;
   a movable driving electrode that is connected to the oscillation member, the movable driving electrode being opposed to the fixed driving electrode, the movable driving electrode being configured to oscillate the oscillation member;
   a fixed detection electrode that is fixed to the substrate;
   a movable detection electrode that is connected to the oscillation member, the movable detection electrode being opposed to the fixed detection electrode, the movable detection electrode being configured to detect a detection signal, the detection signal being varied in accordance with oscillation of the oscillation member;

a fixed monitoring electrode that is fixed to the substrate;

a movable monitoring electrode that is connected to the oscillation member, the movable monitoring electrode being opposed to the fixed monitoring electrode, the movable monitoring electrode being configured to detect a monitoring signal, the monitoring signal being varied in accordance with oscillation of the oscillation member;

a bias voltage application circuit that is connected to the oscillation member via a wiring, the bias voltage application circuit being configured to apply a bias voltage to the oscillation member;

a storage that is configured to store data corresponding to the detection signal;

a driving circuit that is configured to drive the oscillation member based on the monitoring signal, the driving circuit including a band-pass filter circuit and an automatic gain control circuit, the band-pass filter circuit being configured to extract a predetermined frequency component of the monitoring signal, the automatic gain control circuit being configured to amplify an output signal of the band-pass filter circuit while amplitude of the output signal of the band-pass filter circuit is maintained at a predetermined constant value; and a detection circuit that is configured to detect the detection signal based on an output signal of the automatic gain control circuit and to extract an angular velocity component of the detection signal, wherein the bias voltage application circuit is configured to set a value of the bias voltage based on the stored data in the storage, and sensitivity of the gyro sensor is changed according to the stored data.

2. The gyro sensor according to claim 1, wherein the movable detection electrode has a part, the part reciprocates in accordance with the oscillation of the oscillation member, and the fixed detection electrode is provided at both sides of the part of the movable detection electrode.

3. An electronic device comprising:

the gyro sensor according to claim 2; and a display that displays information.

4. The gyro sensor according to claim 1, wherein the movable detection electrode has a part, the part reciprocates in accordance with the oscillation of the oscillation member, and the fixed detection electrode is provided at one side of the part of the movable detection electrode.

5. An electronic device comprising:

the gyro sensor according to claim 4; and a display that displays information.

6. An electronic device comprising:

the gyro sensor according to claim 1; and a display that displays information.

7. A mobile apparatus comprising:

the gyro sensor according to claim 1; and a movable body that houses the gyro sensor.

8. A method for using a gyro sensor, the gyro sensor including:

a substrate;

an oscillation member that is connected to the substrate via a spring;

a fixed driving electrode that is fixed to the substrate, the fixed driving electrode being configured to oscillate the oscillation member;

a movable driving electrode that is connected to the oscillation member, the movable driving electrode being opposed to the fixed driving electrode, the movable driving electrode being configured to oscillate the oscillation member;

a fixed detection electrode that is fixed to the substrate;

a movable detection electrode that is connected to the oscillation member, the movable detection electrode being opposed to the fixed detection electrode, the movable detection electrode being configured to detect a detection signal, the detection signal being varied in accordance with oscillation of the oscillation member;

a fixed monitoring electrode that is fixed to the substrate;

a movable monitoring electrode that is connected to the oscillation member, the movable monitoring electrode being opposed to the fixed monitoring electrode, the movable monitoring electrode being configured to detect a monitoring signal, the monitoring signal being varied in accordance with oscillation of the oscillation member;

a bias voltage application circuit that is connected to the oscillation member via a wiring, the bias voltage application circuit being configured to apply a bias voltage to the oscillation member;

a storage that is configured to store data corresponding to the detected signal;

a driving circuit that is configured to drive the oscillation member based on the monitoring signal, the driving circuit including a band-pass filter circuit and an automatic gain control circuit, the band-pass filter circuit being configured to extract a predetermined frequency component of the monitoring signal, the automatic gain control circuit being configured to amplify an output signal of the band-pass filter circuit while amplitude of the output signal of the band-pass filter circuit is maintained at a predetermined constant value; and a detection circuit that is configured to detect the detection signal based on an output signal of the automatic gain control circuit and to extract an angular velocity component of the detection signal, wherein the bias voltage application circuit is configured to set a value of the bias voltage based on the stored data in the storage, and sensitivity of the gyro sensor is changed according to the stored data, the method comprising:

measuring the detection signal by using the fixed detection electrode; and storing the data corresponding the detection signal into the storage.

* * * * *